Figure 1:
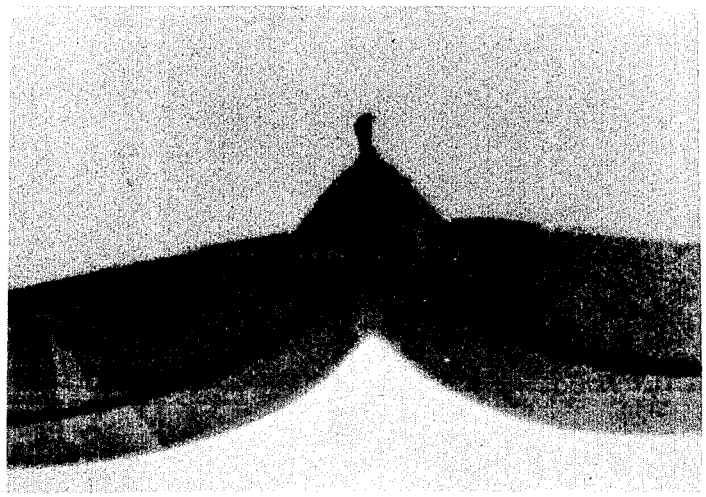

United States Patent [19]

Suzuki et al.

[11] 4,079,850
[45] Mar. 21, 1978

[54] MULTI-LAYER BLOW MOLDED CONTAINER AND PROCESS FOR PREPARATION THEREOF

[75] Inventors: Toru Suzuki, Yokosuka; Shunsaku Hirata, Yokohama; Jinichi Yazaki, Kawasaki; Shinichi Miyazaki, Tokyo; Shigezo Nohara, Yokohama, all of Japan

[73] Assignee: Toyo Seikan Kaisha Limited, Tokyo, Japan

[21] Appl. No.: 551,388

[22] Filed: Feb. 21, 1975

[51] Int. Cl.² .................... B65D 23/00; B29C 17/06
[52] U.S. Cl. .................................. 215/1 C; 264/97; 264/98; 264/99; 264/173; 428/35; 428/174; 428/474; 428/483; 428/516
[58] Field of Search ............... 428/35, 174, 518, 516, 428/483, 474; 215/1 C; 264/97, 98, 99, 173; 425/DIG. 234

[56] References Cited

U.S. PATENT DOCUMENTS

| | | | |
|---|---|---|---|
| 2,710,987 | 6/1955 | Sherman | 264/97 |
| 3,457,337 | 7/1969 | Turner | 264/98 |
| 3,561,629 | 2/1971 | Turner | 215/1 C |
| 3,847,728 | 11/1974 | Hirata et al. | 428/518 |
| 3,869,056 | 3/1975 | Valyi | 215/1 C |
| 3,892,828 | 7/1975 | Weatherly et al. | 264/173 |

Primary Examiner—William R. Dixon, Jr.
Attorney, Agent, or Firm—Diller, Brown, Ramik & Wight

[57] ABSTRACT

In a multi-layer blow molded container having a joint portion at least in the bottom portion thereof, barrier characteristics to gases such as oxygen and water vapor and liquids such as water, solvents, aqueous ammonia and salt water and interlaminar strength characteristics such as interlaminar adhesion strength, peel strength and impact strength in the content-filled state can be highly improved by blow molding a parison of a laminate structure of two or more polymer layers in which the polymer composition is different with respect to the thickness direction of the container wall but substantially identical with respect to the plane direction and each of the polymer layers is continuous with respect to the plane direction, in such a manner that a tapered projection protruding outwardly in the thickness direction of the container wall is formed in the joint portion so that each of the polymer layers is substantially continuous in this joint portion. This improved container can easily be prepared according to the customary blow molding technique by using a pair of split molds having such a configuration that a tapered concave groove is formed in the section pinching off the parison when the molds are registered with each other.

8 Claims, 3 Drawing Figures

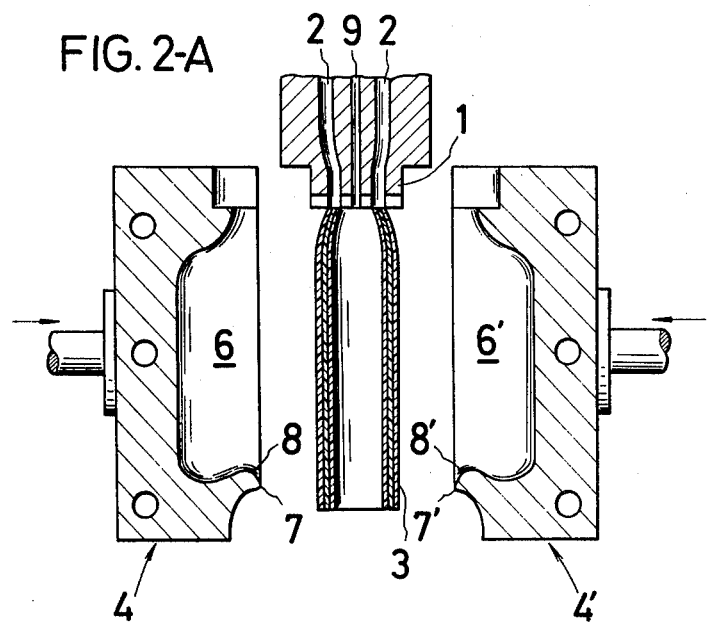
FIG. 2-A
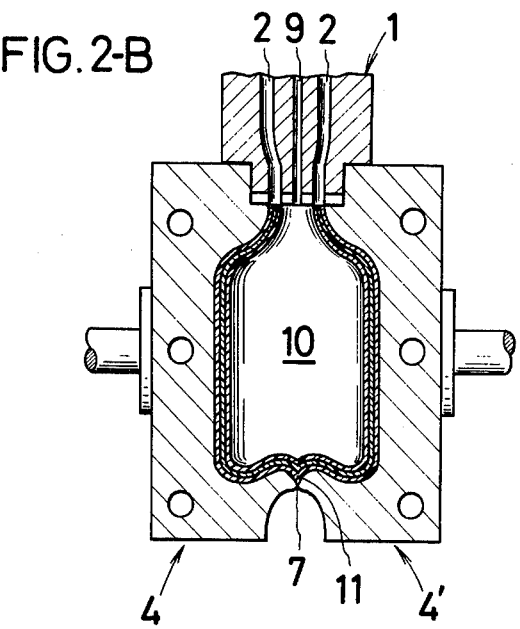
FIG. 2-B

MULTI-LAYER BLOW MOLDED CONTAINER AND PROCESS FOR PREPARATION THEREOF

This invention relates to a multi-layer blow molded container and a process for the production thereof. More particularly, the invention relates to a multi-layer blow molded container in which each of polymer layers of the multi-layer structure constituting the container wall is substantially continuous in the joint portion, whereby such excellent properties as high resistance to oxygen permeation, high moisture resistance, high organic solvent resistance and high chemical resistance are imparted to the multi-layer blow molded container, and to a process for the preparation of such multi-layer blow molded container.

Plastic containers and vessels formed by the so-called blow molding have recently been used broadly in various fields as containers and vessels for liquid and pasty materials such as liquid and pasty foods, drinks, cosmetics, detergents and the like. Conventional techniques concerning these plastic containers are satisfactory in that body portions of relatively large dimensions for receiving contents therein and neck portions of relatively small dimensions to which lids or closures are attached can be molded integrally into optional forms. However, since these plastic containers have a relatively high gas permeability and a relatively high water or chemical permeability, they are still insufficient in that contents cannot be preserved with safety for a long time without deterioration or degradation of contents. For example, polyolefins most broadly used for these plastic containers, such as polyethylene, are excellent in moisture barrier properties, water impermeability and sanitary characteristics, but they have a fatal defect of a high oxygen permeability and hence, they are not suitable for uses where contents such as foods are preserved and stored for a long time. Resins having polar groups, such as saponified ethylene-vinyl acetate copolymers, polyvinylidene chloride resins and polyamides, are excellent over polyolefin resins in the point that they have a high oxygen impermeability, but these oxygen-impermeable resins are very poor in moisture barrier properties and are defective in that they are inferior in such properties as impact resistance and toughness.

Accordingly, in the art of packaging containers, many attempts have heretofore been made to improve in packaging containers barrier characteristics such as resistance to oxygen permeation, moisture impermeability, water impermeability and resistance to permeation of chemical substances such as freon, hydrochloric acid and ammonia, physical properties such as impact resistance, softness, rigidity and squeezability, and optical properties such as transparency and surface gloss, by laminating a plurality of layers of resins different in properties such as mentioned above. According to these attempts, sufficient improvements can be attained when packaging containers having such laminate structure of a plurality of resin layers are bag-like containers or squeeze molded containers, but when these containers having a laminate structure are prepared by blow molding, it frequently happens that sufficient improvements of the above-mentioned barrier characteristics cannot be attained.

As is well known in the art, according to the conventional process for preparing plastic containers by blow molding, a parison is formed by melt extrusion, the parison is pinched off in the state supported between a pair of split molds and simultaneously confronting pinched-off portions of the parison are fusion-bonded to each other, and then, the pinched-off parison is inflated in the molds to mold it into a container form. In the case of an ordinary parison composed of a single layer of a molten resin, the pinched-off portions are bonded together sufficiently to form a joint portion having a practically sufficient adhesion strength such that peeling or insufficient bonding is seldom brought about in this joint portion, and a container having a sufficient adhesion strength can be obtained. In the case of a parison formed by melt-extruding laminates of plural kinds of resins, however, it is extremely difficult to fusion bond the pinched-off portions so that each of the laminate layers is completely continuous in the resulting joint portion, and various disadvantages are frequently brought about. For example, barrier characteristics against various gases and liquids are reduced or lost in this joint portion, or a sufficient adhesion strength cannot be attained in this joint portion.

It is therefore a primary object of this invention to provide a novel multi-layer blow molded container in which the container wall has a molded multi-layer structure of two or more polymer layers where the polymer composition is different with respect to the thickness direction and in which each of the layers of the multi-layer molded structure is substantially continuous in the joint portion of the blow molded container, and to a process for the preparation of such blow molded container.

Another object of this invention is to provide a novel multi-layer blow molded container having excellent barrier properties to various gases and liquids, in which these excellent barrier properties are substantially retained even in the joint portion of the blow molded container, and to a process for the preparation of such blow molded container.

Still another object of this invention is to provide a multi-layer blow molded container in which the adhesion strength and the impact strength of the container in the content-filled state are maintained at very high levels even though the container wall is composed of laminates of molded polymers, and to a process for the preparation of such blow molded container.

A further object of this invention is to provide a process for the preparation of multi-layer blow molded containers in which a multi-layer blow molded container having the above-mentioned excellent properties can be prepared with ease by using known means in the same manner as in the conventional methods except that specific multi-layer extrusion means and specific blow molding molds are employed.

In accordance with one fundamental aspect of this invention, there is provided a plastic container composed of a container wall formed by blow molding and provided with a joint portion at least in the bottom thereof, wherein said container wall has a multi-layer molded structure of two or more polymer layers in which the polymer composition is different with respect to the thickness direction of the container wall but substantially identical with respect to the plane direction and each of polymer layers constituting the multi-layer structure is continuous with respect to the plane direction, and wherein said joint portion forms a tapered projection protruding outwardly in the thickness direction of the container wall so that each of polymer layers constituting the multi-layer structure is substantially continuous in said joint portion.

In accordance with another fundamental aspect of this invention, there is provided a process for the preparation of plastic containers comprising co-melt-extruding plural kinds of polymers in the form of a parison so that the polymer composition is substantially identical with respect to the extrusion direction but different with respect to the direction laterally crossing the extrusion direction and each polymer layer is continuous in the extrusion direction, supporting the co-melt-extruded parison between a pair of split molds having such a configuration that a tapered concave groove is formed in the section pinching off the parison when the molds are registered with each other, and inflating the parison in the split molds to form an outwardly protruding projection in the joint portion of the parison so that each of the polymer layers constituting the parison is substantially continuous in said joint portion.

In this invention, by the "container" referred to in the instant specification is meant a molded article having a content-filling space encircled with a wall and an opening for filling or taking out the content. As far as the container has the above structure, it can take an optional form. For instance, it can take any of forms of bottles, squeeze containers such as tubes and squeeze packs, jars, tanks and the like.

As container-constituting plastics, there can be used various melt-modable organic polymers and compositions thereof. For example, there can be mentioned (1) polyolefins such as low density polyethylene, medium density polyethylene, high density polyethylene, isotactic polypropylene, ethylenepropylene copolymers, polybutene, polypentene-1, polystyrene, polybutadiene and styrene-butadiene copolymers; (2) vinyl polymers such as polyvinyl chloride, polyvinylidene chloride, polyvinyl acetate, polyvinyl alcohol and polyvinyl butyral; (3) acrylic polymers such as polymethyl acrylate, polymethyl methacrylate, polyethyl acrylate, polyacrylonitrile, acrylic acid-containing copolymers and methacrylic acid-containing copolymers; (4) polyamides such as nylon 6, nylon 66 and nylon 12; (5) polyesters such as polyethylene terephthalate, polytetramethylene terephthalate and polytetramethylene terephthalate-polytetramethylene oxide copolymers; (6) polycarbonates; (7) polysulfones; (8) copolymers composed of two or more of monomers constituting the foregoing polymers; and (9) polymer blends composed of two or more of the foregoing polymers.

In the blow molded container of this invention, in order to improve barrier properties to various gases and liquids, it is important that the contíner wall has a multi-layer molded structure of laminates of polymer layers in which the polymer composition is different with respect to the thickness direction but substantially identical with respect to the plane direction and each of the polymer layers is continuous in the plane direction.

By the term of "the thickness direction" used in the instant specification is meant the direction giving a minimum dimension from one surface (for example, the outer surface) to the other surface (for example, the inner surface) of the container wall, and by the term of "the plane direction" is meant the direction rectangular to said thickness direction. Further, in the instant specification, by the sentence "the polymer composition is different in the thickness direction in the container wall" is meant the fact that the container wall is composed of two or more of polymer compositions and the proportions of these polymer compositions vary continuously or discontinuously with respect to the thickness direction though the combination of the polymer compositions does not change.

A typical instance of a container having the above structure is formed by combining the blow molding technique with the so-called multi-layer co-extrusion method. More specifically, plural kinds of molten resin flows formed by a plurality of extruders are co-extruded through a multiply die in the form of a parison of the multi-layer structure, and the parison is blow molded into the form of a container. The resulting container wall of the multi-layer structure comprises two or more resin layers in a manner laminated in the thickness direction, and the resin composition varies discontinuously in each boundary area between the two resin layers.

Another suitable instance of the multi-layer molded structure is a molded structure formed by melt-extruding a melt of a blend of two or more of resins by using one extruder, in which a multi-layer structure is manifested in the resulting molded structure. More specifically, when two or more different resins are molten and the molten resin mixture is extruded under such extrusion conditions that the difference of the average flow rate between melts of respective resins is at least 1 cm/sec and respective molten resin flows pass through the die passage in the form of laminar flows without substantial mingling, there is obtained a molded article having a multi-layer structure comprising a layer containing predominantly one resin and a layer containing predominantly another layer, which multi-layer structure is manifested because of the above-mentioned difference of the average flow rate. In the multi-layer structure of this type, the resin composition tends to change continuously in the thickness direction of the container wall. This method for obtaining a multi-layer molded structure by melt-extrusion of a polymer blend is detailed in, for example, the specification of German Laid-Open Patent Application No. 2,301,470.

It is also possible to adopt in combination the above-mentioned two methods for forming multi-layer molded structures. In this case, there can be obtained a multi-layer laminate molded structure composed of two or more resin layers, in which at least one of these resin layers is a layer of a polymer blend in which a sub-layer containing predominantly one resin of the polymer blend and another sub-layer containing predominantly another resin of the polymer blend are manifested (see our co-pending U.S. Ser. No. 399,805 and British Patent Application No. 39091/73).

In this invention, combinations of polymers to be formed into a multi-layer structure are appropriately chosen from a variety of thermoplastic resins depending on the intended use of the container. For example, various polymers free of polar groups, especially polyolefins, are suitable for improving moisture barrier properties (resistance to water vapor permeation) and resistance to water permeation, and polymers having polar groups such as hydroxyl groups, halogens or carbonyl groups of the carboxylic acid, carboxylic acid salt, amide or ester form, especially saponified ethylene-vinyl acetate copolymers having an ethylene content of 25 to 75 mole % and a degree of saponification of at least 93%, polyvinylidene chloride, polyvinyl chloride, polyamides such as nylon 6, nylon 66 and nylon 12, and ionomers such as Surlyn ® (manufactured by Du Pont), are used for improving resistance to oxygen permeability and barrier properties to non-polar organic solvents. Further, in a container for foods, drinks and the like, in view of sanitary characteristics it is preferred that the innermost layer of the container be composed of a polyolefin, and in view of the strength and impact resistance, it is preferred that the outermost layer of the container be composed of a polyolefin. In the case of a container to be used to preserve or store the content for a long time, it is preferred that an oxygen barrier layer composed of a polar group-containing resin such as mentioned above be formed as an innermost layer or intermediate layer (most preferred) of the container wall. In this invention, each of layers of the multi-layer molded structure may be composed of a single resin or a blend of two or more resins. For example, at least one layer of the multi-layer molded structure may be a layer of a blend of a polyolefin and a saponified ethylene-vinyl acetate copolymer or polyamide such as mentioned above, and in this blend layer it is possible to manifest a sub-layer containing predominantly the polyolefin and another sub-layer containing predominantly the saponified ethylene-vinyl acetate copolymer or polyamide. When such blend layer is used, it is made possible to improve the interlaminar strength and peel strength among layers composed of different kinds of resins. As preferable examples of the polymer blend to be effectively used for attaining this object, there can be mentioned polymer blends formed by blending polyolefin, a saponified ethylene-vinyl acetate copolymer or polyvinylidene chloride with a thermoplastic polymer containing carbonyl groups at a concentration of 120 to 1400 meq/100 g, such as polyvinyl acetate, ionomers, maleic acid-modified polypropylene and acrylic acid-grafted polyethylene. In forming a container including such a blend layer of the above-mentioned laminate structure having sub-layers, it is preferred that a blend comprising 100 parts by weight of a saponified ethylene-vinyl acetate copolymer having an ethylene content of 25 to 75 mole % and a degree of saponification of at least 93% and 0.5 to 120 parts by weight of a polyolefin or a thermoplastic polymer containing carbonyl groups at a concentration of 120 to 1400 meq/100 g be used.

Examples of preferred combinations of polymers to be formed into multi-layer structures suitable for attaining the objects of this invention include saponified ethylene-vinyl acetate copolymer/polyolefin, polyamide/polyolefin, polyolefin/saponified ethylene-vinyl acetate copolymer/polyolefin, polyolefin/blend of saponified ethylene-vinyl acetate copolymer and polyolefin/polyolefin, polyolefin/polyvinylidene/polyolefin, polyolefin/polyamide/polyolefin, polyolefin/acrylic acid ester-acrylnitrile copolymer/polyolefin, polyolefin/ionomer/polyolefin, etc.

In case there is attained no sufficient adhesion between two adjacent polymer layers, it is possible to improve the bondability between the two layers by incorporating the above-mentioned carbonyl group-containing polymer in an amount of 0.5 to 15% by weight into at least one of these layers. When it is desired to improve the interlaminar strength or the peel strength between two adjacent polymer layers, it is possible to dispose a blend layer containing polymers of the two layers between said two adjacent layers.

One of important features of the blow molded container of this invention is that the container wall is composed of the above-mentioned multi-layer molded structure of two or more polymer layers and a joint portion formed at least in the bottom of the container at the pinching-off and fusion bonding step of blow molding is arranged to form a tapered projection protruding outwardly in the thickness direction of the container wall so that each of polymer layers of the multi-layer molded structure is substantially continuous in this joint portion.

The importance of formation of a tapered projection protruding outwardly in the thickness direction of the container wall in the joint portion at the pinching-off and fusion bonding step of blow molding will be apparent from comparative data shown in Table 1 given hereinafter and FIG. 1 of the accompanying drawings. More specifically, in a container obtained by forming a parison of a multi-layer structure including outer and inner layers of polyethylene and an intermediate layer of a saponified ethylene-vinyl acetate copolymer by co-extrusion and blow molding this parison by using conventional split molds, it is impossible to make these polymer layers substantially continuous in the joint portion. In this blow molded container (Sample 1), the oxygen permeation in the joint portion is as high as 340 $cc/m^2 \cdot day \cdot atm$. In the case of a blow molded container (Sample 11) formed by blow molding a parison of the above multi-layer structure by using a pair of split molds having such a configuration that a projection uniform in the width is formed in the joint portion, the oxygen permeation in the joint portion is similarly as high as 450 $cc/m^2 \cdot day \cdot atm$.

In contrast, in the case of a blow molded container (Sample 5) formed by blow molding a parison of the above multi-layer structure according to this invention so that a tapered projection protruding outwardly in the thickness direction of the container wall is formed in the joint portion, the oxygen permeation can be reduced to such a low level as 7 $cc/m^2 \cdot day \cdot atm$.

The feature of this invention that by forming a tapered projection in the joint portion it is made possible to make each of the polymer layers substantially continuous in the joint portion will readily be apparent from FIG. 1 which is a microscopic photograph of the section of the joint portion of a dyed sample of the container of this invention. In the photograph of FIG. 1, the intermediate layer (the layer seen black in the photograph) is a layer of a saponified ethylene-vinyl acetate copolymer dyed with Congo Red, and inner and outer layers (layers seen white in the photograph) are polyethylene layers. From this photograph it will readily be understood that a pyramid-like projection is formed in the joint portion of the container wall and each of polymer layers is continuous in this portion.

The sectional form of the projection formed in the joint portion of the blow molded container of this invention is not particularly critical, as far as it satisfies the requirement that the projection is tapered. For example, the projection may have a section of any of V-figured, U-figured, semi-circular, semi-oval and trapezoid forms. Further, the section of the projection may have a combination of two or more of these forms, for example, a combination of U-figured and V-figured forms. It is most preferred that the angle of opening of the tapered portion of the projection in the joint portion be about 90°. However, as is seen from the results shown in Examples given hereinafter, if the angle of opening of the tapered portion of the projection is within a range of 45° to 120°, practically sufficient gas barrier properties and adhesion characteristics can be obtained. The dimension of the tapered projection is varied to some extent depending on the thickness of the container wall, but it is generally preferred that the protrusion length of the tapered projection be 0.5 to 5 mm, especially 1.0 l to 3 mm.

In this invention, in order to form such tapered projection in the joint portion of a blow molded container, a pair of split molds having such a configuration that a tapered concave groove is formed at the section pinching off the parison when registered with each other is employed, and the parison is inflated in the state supported between said split molds.

Formation of the blow molded container of this invention will now be described by reference to FIGS. 2-A and 2-B illustrating the blow molding process of this invention. Referring to FIGS. 2-A and 2-B, a multi-layer resin flow composed of two or more polymers fed in the heated and molten state from one or more extruders (not shown) is melt-extruded in the form of a parison 3 of the multi-layer structure through a ring-like resin passage 2 of a die 1. A pair of split molds 4 and 4' capable of reciprocative movements are disposed around the so extruded parison. These split molds have such a configuration that when they are registered with each other, a cavity 5, 5' corresponding to the outer shape of the container is formed in the split molds 4 and 4' and a tapered concave groove 8 is formed in pinching-off sections 7 and 7' for supporting the parison and pinching off the parison. The shape and demension of this concave groove 8 are so designed that it is substantially in agreement with the tapered projection in the joint portion of the blow molded container.

In FIG. 2-A showing the state where split molds are opened, when a parison 3 of the multi-layer structure is extruded into a form of prescribed dimensions, a pair of split molds 4 and 4' in the separated state are moved in directions indicated by arrows, namely in such directions that they are registered with each other, and as shown in FIG. 2-B showing the state where the split molds are registered, the parison 3 is supported in the split molds by pinching-off sections 7 and 7' and simultaneously pinched off by these sections 7 and 7'. Coincidentally, compressed air is blown into the interior of the parison through a compressed air blow opening 9, whereby a blow molded container 10 is formed. At this point, a tapered projection 11 corresponding to the tapered concave groove 8 formed at the pinching-off sections of the split molds 4 and 4' is formed in the joint portion of the blow molded container 10.

The reason why in the container of this invention each of the polymer layers constituting the container wall is made continuous in the joint portion when a tapered projection is formed in the joint portion of the blow molded container has not yet been completely elucidated. However, we presume that when such tapered projection is formed in the joint portion, the parison may probably be sheared so that it can have a dimension larger than the thickness thereof and resins may probably be embedded sufficiently in the tapered projection, whereby each of resin layers can be made continuous.

The multi-layer blow molded container of this invention has excellent barrier properties to various gases such as oxygen, water vapor and carbon dioxide gas and various liquids such as water, organic liquids, aqueous ammonia and hydrochloric acid, because of the specific structure in which each of the container wall-constituting resin layers is substantially completely continuous in the joint portion. Further, it has such excellent adhesion and peel resistance that it can resist such high impacts as given at the falling test conducted on content-filled samples. Owing to these characteristic properties, the multi-layer blow molded container of this invention is very suitable and effective for preserving and storing various contents, especially liquid, creamy and pasty foods, drinks, cosmetics, medicines, inks, liquid developers, organic solvents, inorganic and organic chemicals, liquid fuels and the like, for a relatively long time, and the multi-layer blow molded container is especially useful for preserving and storing foods and drinks which are readily degraded or deteriorated under influences of oxygen, such as edible oil, butter, margarine, lard, mayonnaise, dressing, ketchup, vinegar, soy, sauces, miso paste, sake, sweet sake, soba soup, and the like, for a long time.

Further, according to this invention, since each of the container wall-constituting resin layers can be made substantially completely continuous in the pinched-off and fusion bonded portion of the parison, namely the joint portion of the multi-layer blow molded container, it is made possible to form a neck portion of a small diameter in the container by pinching-off of the parison or provide the container with a handle without reduction of the barrier properties to various gases and liquids.

This invention will now be illustrated in detail by reference to the following Examples.

In these Examples, the oxygen gas permeation $QO_2$ and the falling strength were determined according to the following methods:

1. Oxygen Gas Permeation, $QO_2$

Nitrogen gas was filled into a sample bottle in vacuum and the mouth portion of the bottle was sealed with a rubber stopper. The contact area between the bottle mouth and rubber stopper was covered with an epoxy type adhesive, and the bottle was stored for a certain prescribed period in a thermostat tank in which the temperature and relative humidity were maintained at 37° C. and 15%, respectively. Then, the concentration of oxygen which had permeated into the bottle was determined by gas chromatography, and the oxygen gas permeation, $QO_2$ was calculated according to the following equation:

$$QO_2 = \frac{m \times \frac{CT}{100}}{t \times Op \times A} \text{ [cc/m}^2 \cdot \text{day} \cdot \text{atm]}$$

in which $m$ denotes the amount (ml) of nitrogen gas filled in the bottle, $t$ indicates the period (days) during which the bottle was allowed to stand still in the thermostat tank, $CT$ indicates the concentration (% by volume) of oxygen in the bottle observed when the bottle was kept for $t$ days in the thermostat tank, $A$ stands for the effective surface area ($m^2$) of the bottle, and $Op$ denotes the partial pressure [atm] of oxygen (= 0.209).

Each value of the oxygen permeation was an average value obtained when the test was conducted on three samples.

2. Falling Peel Strength, $\overline{D}$:

10 Bottles were chosen with respect to each kind of the container, and a prescribed amount of salt water was filled in each bottle. Then, the mouth portion of the bottle was sealed with a cap and allowed to stand still over two days and nights in an atmospheres maintained at −2° C. Then, the bottle was let to fall on a concrete face from a height of 120 cm at an atmosphere temperature of 20° C. so that the bottom face of the bottle impinged against the concrete face. This procedure of falling of the bottle was repeated until peeling was caused in the joint portion of the bottle bottom. The average frequency $\overline{D}$ of falling performed until peeling was caused in the joint portion of the bottle bottom was calculated according to the following formula:

$$\overline{D} = \frac{\Sigma ni}{N}$$

in which $ni$ indicates the frequency of falling performed in each sample until peeling was caused in the bottom joint portion, and $N$ denotes the number of the samples tested.

EXAMPLE 1

100 Parts by weight of a 50:50 (weight ratio) mixture of a low density polyethylene having a density (ASTM D-1505) of 0.920 g/cc and a melt index (ASTM D-1238)

split molds was so arranged that the section of the bottle bottom joint portion rectangular to the bonded face was flat or V-figured, U-figured or ⊔-figured in the outward direction. In the case of the V-figured section, the opening angle of the figure V was 45°, 60°, 90° or 120°. In the case of the V-figured section of an opening angle of 90°, the depth of the figure V was 1.0, 1.5, 3.0 or 5.0 mm. In the case of the U-figured or ⊔-figured section, the depth of the joint portion was 1.5 mm or 2.0 mm. In short, parisons having the above-mentioned three-layer structure were molded into sample bottles according to the known blow molding method by using the foregoing 12 kinds of molds. In each of these bottles, the thickness ratio of outer layer:intermediate layer:inner layer was 4.5:1:4.5, and each bottle had a weight of 25 g. At the blow molding step, the mold temperature was 12° C. These sample bottles were subjected to the above-mentioned oxygen gas permeation test and falling test to obtain results shown in Table 1.

Table 1

| Sample No. | Shape of Section of Bottle Bottom Joint Portion | Opening Angle of Bottle Bottom Joint Portion | Depth of Bottle Bottom Joint Portion | Average Frequncy, D Average $\overline{D}$ of Falling Performed Until Peeling Was Caused at Bottle Bottom Joint Portion | Oxygen Gas Permeation, $QO_2$ | |
|---|---|---|---|---|---|---|
| | | | | | before falling test | after falling was repeated 10 times |
| 1 | flat | 180° | 0 mm | 3 times | 45 | 340 |
| 2 | V-figured | 120° | 1.5 mm | 14 times | 8 | 28 |
| 3 | " | 90° | 5.0 mm | 12 times | 7 | 46 |
| 4 | "90° | | 3.0 mm | 23 times | 7 | 12 |
| 5 | " | 90° | 1.5 mm | 45 times | 6 | 7 |
| 6 | "90° | | 1.0 mm | 26 times | 6 | 8 |
| 7 | " | 60° | 1.5 mm | 25 times | 7 | 10 |
| 8 | "45° | | 1.5 mm | 16 times | 7 | 11 |
| 9 | U-figured | — | 2.0 mm | 20 times | 7 | 12 |
| 10 | " | — | 1.5 mm | 38 times | 6 | 10 |
| 11 | ⊔-figured | — | 2.0 mm | 1 time | 58 | 450 |
| 12 | " | — | 1.5 mm | 2 times | 65 | 570 | of 0.3 g/10 min and a saponified ethylene-vinyl acetate copolymer having an ethylene content of 25.4 mole %, a degree of saponification of 99.2% and an intrinsic viscosity of 0.10 l/g was mixed with 10.0 parts by weight of Surlyn ® A (ionomer manufactured by Du Pont; ion type = Na; carbonyl concentration = 160 meq/100 g; melt index = 1.2 g/10 min). The resin mixture was dry-blended for 3 minutes at room temperature by using a Henschel mixer, and the resulting dry blend was heated, kneaded and pelletized by means of a pelletizer having a screw of a diameter of 40 mm and an effective length of 1120 mm (the rotation number of the screw being 35 rpm and the die temperature being 185° C.). The so kneaded and pelletized blend and the above-mentioned low density polyethylene were co-extruded by using a three-ply die maintained at 190° C. while passing the blend through an intermediate layer-forming extruder having a screw of a diameter of 40 mm and an effective length of 800 mm and passing the low density polyethylene through an inner and outer layer-forming extruder installed with a screw of a diameter of 65 mm and an effective length of 1430 mm and provided with an adaptor having a two-branched melt channel, to thereby form a parison having a symmetric three-layer structure in which the outer and inner layers were composed of the low density polyethylene and the intermediate layer was composed of the above-mentioned three-component resin blend. Then, the parison was blow molded by using a pair of split molds having a cavity corresponding to a cylinder having a diameter of 60 mm, a height of 230 mm, an inner volume of 500 ml and a bottom raising of 6 mm. The configuration of the

EXAMPLE 2

In the same manner as described in Example 1, 100 parts by weight of a 50:50 (weight ratio) of a mixture of a low density polyethylene having a density of 0.920 g/cc (ASTM D-1505) and a melt index of 0.3 g/10 min (ASTM D-1238) and a saponified ethylene-vinyl acetate copolymer having an ethylene content of 25.4 mole %, a degree of saponification of 99.2% and an intrinsic viscosity of 0.10 l/g was mixed with 10.0 parts by weight of Surlyn ® A (ionomer manufactured by Du Pont; ion type = Na; carbonyl concentration = 160 meq/100 g; melt index = 1.2 g/10 min), and the mixture was blended, kneaded, extruded and pelletized. A parison of a three-layer structure was prepared by co-extruding the resulting pelletized blend as the material of the intermediate layer and a low density polyethylene having a density of 0.920 g/cc and a melt index of 0.3 g/10 min as the material of the outer and inner layers in the same manner as described in Example 1. (The so prepared parison is designated as "sample C-1.")

A parison of a three-layer structure was prepared by co-extruding, in the same manner as described in Example 1, a pelletized resin blend formed in the same manner as above with respect to sample C-1 except that no Surlyn ® was incorporated, as the intermediate layer-forming material and a low density polyethylene having a density of 0.920 g/cc and a melt index of 0.3 g/10 mm as the inner and outer layer forming material. (The so obtained parison is designated as "sample C-2.")

In the same manner as described in Example 1, a saponified ethylene-vinyl acetate copolymer having an ethylene content of 25.4 mole %, a degree of saponification of 99.2 % and an intrinsic viscosity of 0.10 l/g and the above-mentioned Surlyn ® A were blended at a weight ratio of 1:1, kneaded, extruded and pelletized. A parison of a three-layer structure was prepared by co-extruding the so pelletized resin blend as the intermediate layer-forming material and an isotactic polypropylene having a melt index of 0.8 g/10 mm as the inner and outer layer-forming material in the same manner as described in Example 1. (The so obtained parison is designated as "sample C-3.")

A parison of a three-layer structure was prepared by co-extruding nylon 6 having a relative viscosity of 3.4 as measured in 98% sulfuric acid concentration = 10.0 g/l; temperature = 20° C.) and a carbonyl concentration of 890 meq/100 g as the intermediate layer-forming material and a low density polyethylene having a density of 0.920 g/cc and a melt index of 0.3 g/10 min as the inner and outer layer-forming material in the same manner as described in Example 1. (The so prepared parison is designated as "sample C-4.")

Each of the so prepared parisons was molded into a bottle according to the known molding method by using a pair of split molds having a cavity corresponding to a cylinder of a diameter of 60 mm, a height of 230 mm and an inner volume of 500 ml and having such a configuration as providing a bottle bottom joint portion of a V-figured sectional shape having an opening angle of 90° and a depth of 1.5 mm. In each of the so prepared bottles, the thickness ratio of inner layer:intermediate layer:outer layer was 4.5:1:4.5, and each bottle had a weight of 25 g.

The so prepared bottles were subjected to the above-mentioned oxygen gas permeation test and falling test to obtain results shown in Table 2.

Table 2

| Sample | Average Frequency, $\overline{D}$ of Falling Performed Until Peeling Was Caused in Bottle Bottom Joint Portion | $QO_2$ before falling test | $QO_2$ after falling was repeated 10 times |
|---|---|---|---|
| C-1 | 45 times | 15 | 18 |
| C-2 | 33 times | 30 | 32 |
| C-3 | 20 times | 29 | 44 |
| C-4 | 15 times | 45 | 56 |

What is claimed is:

1. A plastic container composed of a container wall formed by blow-molding a tubular parison and provided with a joint portion at least in the bottom thereof formed by pinching off said parison, wherein said container wall has a multi-layer molded structure including an inner surface layer composed of a polyolefin, an outer surface layer composed of a polyolefin and an oxygen-barrier intermediate layer composed of a saponified ethylene-vinyl acetate copolymer having an ethylene content of 25 to 75 mole % and a degree of saponification of at least 93%, a polymer blend of said saponified copolymer and other thermoplastic resin, or a polyamide, and wherein said joint portion forms a tapered projection protruding outwardly in the thickness direction of the container wall so that each of the polymer layers constituting the multi-layer structure is substantially continuous in said joint portion.

2. A plastic container as set forth in claim 1 wherein said joint portion forms a tapered projection protruding outwardly in the thickness direction of the container wall and said projection has an opening angle of about 45° to about 120°.

3. A plastic container as set forth in claim 2 wherein said projection has a V-figured sectional form of an opening angle of substantially 90°.

4. A plastic container as set forth in claim 1 wherein said projection has a protrusion length of 0.5 to 5 mm.

5. A plastic container as set forth in claim 1 wherein the oxygen-barrier intermediate layer is composed of a polymer blend of said saponified ethylene-vinyl acetate copolymer and at least one member selected from polyolefins and thermoplastic polymer containing carbonyl groups at a concentration of 120 to 1400 meq/100 g of the polymer.

6. A plastic container as set forth in claim 5 wherein said blend comprises 100 parts by weight of said saponified ethylene-vinyl acetate copolymer and 0.5 to 120 parts by weight of at least one member selected from polyolefins and thermoplastic polymers containing carbonyl groups at a concentration of 120 to 1400 meq/100 g of the polymer.

7. A plastic container composed of a container wall formed by blow-molding a tubular parison and provided with a joint portion at least in the bottom thereof formed by pinching off said parison, wherein said container wall has a multi-layer structure including an inner surface layer of a polyolefin, an outer surface layer composed of a polyolefin and an oxygen-barrier intermediate layer composed of a polymer bland of (a) 100 parts by weight of a saponified ethylene-vinyl acetate copolymer having an ethylene content of 25 to 75 mole % and a degree of saponification of at least 93% and 0.5 to 120 parts by weight of at least one member selected from polyolefins and thermoplastic polymers containing carbonyl groups at a concentration of 120 to 1400 meq/100 g of the polymer, and wherein said joint portion forms a tapered projection protruding outwardly in the thickness direction of the container wall so that each of the polymer layers constituting the multi-layer structure is substantially continuous in said joint portion, said projection having a V-figured sectional form of an opening angle of about 45° to about 120° and a protrusion length of 0.5 to 5 mm.

8. A process for the preparation of plastic containers comprising forming a tubular parison of a multi-layer structure including an inner surface layer composed of a polyolefin, and an outer surface layer of a polyolefin and an oxygen-barrier intermediate layer composed of a saponified ethylene-vinyl acetate copolymer having an ethylene content of 25 to 75 mole % and a degree of saponification of at least 93% and selectively a polyamide by means of co-melt-extrusion and a polymer blend of said saponified copolymer and other thermoplastic resin, providing a split mold including a pair of mold halves having such a configuration that a tapered concave groove is formed interiorly of the mold in the section pinching off the parison when the mold halves are resistered with each other, supporting the co-melt-extruded parison in said split mold, and inflating the parison in the split mold to form an outwardly protruding projection in the joint portion of the parison so that each of the layers constituting the parison is substantially continuous in said joint portion.

* * * * *